(12) United States Patent
Moon et al.

(10) Patent No.: US 11,762,051 B2
(45) Date of Patent: Sep. 19, 2023

(54) METHODS AND SYSTEMS FOR LINE-OF-SIGHT (LOS) MULTIPLE-INPUT AND MULTIPLE-OUTPUT (MIMO) COMMUNICATIONS WITH ANTENNA MISALIGNMENTS

(71) Applicant: Samsung Electronics Co., Ltd., Suwon-si (KR)

(72) Inventors: Jang Wook Moon, San Diego, CA (US); Hongbing Cheng, San Diego, CA (US); Jungwon Lee, San Diego, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 59 days.

(21) Appl. No.: 17/199,432

(22) Filed: Mar. 11, 2021

(65) Prior Publication Data
US 2022/0107381 A1    Apr. 7, 2022

Related U.S. Application Data

(60) Provisional application No. 63/087,170, filed on Oct. 2, 2020.

(51) Int. Cl.
*H01Q 3/00* (2006.01)
*G01S 3/60* (2006.01)
(Continued)

(52) U.S. Cl.
CPC .............. *G01S 3/60* (2013.01); *G01S 3/043* (2013.01); *H01Q 3/2605* (2013.01); *H01Q 21/00* (2013.01); *H04B 7/0452* (2013.01)

(58) Field of Classification Search
CPC ......... G01S 3/60; G01S 3/043; H01Q 3/2605; H01Q 21/00; H04B 7/0452
(Continued)

(56) References Cited

U.S. PATENT DOCUMENTS 8,229,017 B1 *  7/2012  Lee .................... H04B 7/0665
                                              375/267
8,781,020 B1 *  7/2014  Lee .................... H04B 7/0665
                                              375/267
(Continued)

OTHER PUBLICATIONS

Extended European Search Report for Application No. 21185305.6, dated Jan. 21, 2022.
(Continued)

*Primary Examiner* — Chuong P Nguyen
(74) *Attorney, Agent, or Firm* — Renaissance IP Law Group LLP

(57) ABSTRACT

A system and a method are disclosed for estimating antenna misalignments in a line-of-sight wireless communication system and using the estimated antenna misalignments to form an optimal beam that may provide the best performance based on the channel conditions. A receiver determines a rotational estimate and a translational estimate of the receiver with respect to a transmitter, and sends feedback information to the transmitter that is used to determine an optimal beamforming matrix for LOS communications between the receiver and the transmitter. The feedback information includes estimated rotational angles and an estimated translational distance between the receiver and the transmitter, or includes an offset angle between a first plane of antennas of the receiver and a second plane of antennas of the transmitter, a normal vector of the first plane of antennas and the estimated translational distance. The antennas may be antenna arrays or single-element antennas.

20 Claims, 4 Drawing Sheets

(51) Int. Cl.
  *G01S 3/04*  (2006.01)
  *H01Q 3/26*  (2006.01)
  *H04B 7/0452*  (2017.01)
  *H01Q 21/00*  (2006.01)

(58) Field of Classification Search
  USPC .................................................. 342/359, 373
  See application file for complete search history.

(56) References Cited

U.S. PATENT DOCUMENTS

| | | | |
|---|---|---|---|
| 9,578,644 | B2 | 2/2017 | Yu et al. |
| 9,866,286 | B1 | 1/2018 | Qu et al. |
| 10,326,500 | B1 * | 6/2019 | Qu .......................... H04B 1/385 |
| 10,359,496 | B2 | 7/2019 | Zlogar et al. |
| 10,659,138 | B1 * | 5/2020 | Shahmohammadian .................... H04B 7/10 |
| 11,005,541 | B2 * | 5/2021 | Lee ......................... H04B 17/27 |
| 11,296,428 | B2 * | 4/2022 | Moon .................. H01Q 21/065 |
| 2016/0173149 | A1 | 6/2016 | Ling |
| 2017/0222704 | A1 | 8/2017 | Eitan et al. |
| 2019/0124585 | A1 * | 4/2019 | Katabi ................... H04B 17/30 |
| 2021/0076228 | A1 * | 3/2021 | Han ..................... H04B 7/0617 |
| 2022/0018925 | A1 * | 1/2022 | Duan .................. H04W 64/003 |
| 2022/0224397 | A1 * | 7/2022 | Horn ................... H04B 7/0617 |
| 2022/0247091 | A1 * | 8/2022 | Moon .................. H04B 7/0691 |
| 2022/0278736 | A1 * | 9/2022 | Guo ....................... H04B 7/088 |
| 2022/0416848 | A1 * | 12/2022 | Zhang ................... H04B 7/088 |

OTHER PUBLICATIONS

Akyildiz, Ian F. et al., "Combating the Distance Problem in the Millimeter Wave and Terahertz Frequency Bands", IEEE Communications Magazine, 2018, 8 pages.

Bahadori, Niloofar et al., "Device-to-Device Communications in Millimeter Wave Band: Impact of Beam Alignment Error", 2019 Wireless Telecommunications Symposium (WTS), 2019, 6 pages.

Bohagen, Frode et al., "Design of Optimal High-Rank Line-of-Sight MIMO Channels", IEEE Transactions on Wireless Communications, vol. 6, No. 4, 2007, 27 pages.

Cheng, Wenchi et al., "Achieving Practical OAM Based Wireless Communications with Misaligned Transceiver", IEEE International Conference on Communications (ICC), 2019, 6 pages.

Han, Chong et al., "Multi-Ray Channel Modeling and Wideband Characterization for Wireless Communications in the Terahertz Band", IEEE Transactions Wireless Communications, vol. 14, No. 5, 2015, 12 pages.

Huo, Yiming et al., "Enabling Multi-Functional 5G and Beyond User Equipment: A Survey and Tutorial", IEEE Access, vol. 7, 2019, pp. 116975-117008.

Li, Rui et al., "Analysis of Panel Antenna Arrays in Los MIMO System", IEEE Access, vol. 6, 2018, pp. 23303-23315.

Meshlogic, "Fitting a Circle to Cluster of 3D Points," https://meshlogic.github.io/posts/jupyter/curve-fiLling/fitting-a-circle-tocluster-of-3d-points/, 2016, 12 pages.

Moon, Jangwook et al., "Antenna Location Design for Line-of-Sight Communications," 2020 IEEE 92nd Vehicular Technology Conference (VTC2020-Fall), 2020, 3 pages.

Schmidt, Ralph Otto, "A Signal Subspace Approach to Multiple Emitter Location," Ph D. Dissertation, Dept. Elect. Eng., Stanford University, 1981, 24 pages.

Shannon, C. E., "A Mathematical Theory of Communication", The Bell System Technical Journal, vol. 27, 1948, 55 pages.

Stack Exchange, "Finding the intersection point of many lines in 3D (point closest to all lines)," https://math.stackexchange.com/questions/61719/finding-the-intersectionpoint-of-many-lines-in-3d-point-closest-to-all-lines, 2018, 5 pages.

Stoica, Petre et al., "Improved Sequential Music", IEEE Transactions on Aerospace and Electronic Systems, vol. 31, No. 4, 1995, p. 1230-1239.

Wang, Ting et al., "Two-Dimension Direction-of-Arrival Estimation for Massive MIMO Systems", IEEE Access, vol. 3, 2015, pp. 2122-2128.

Wikipedia, "Rodrigues", Wikimedia Foundation, https://en.wikipedia.org/wiki/Rodrigues, 2022, 9 pages.

Yuan, Yifei et al., "Potential Key Technologies for 6G Mobile Communications", Science China Information Sciences, 33(8), 183301, 2020, 29 pages.

Zhou, Liang et al., "Low Complexity Millimeter-Wave LOS-MIMO Precoding Systems for Uniform Circular Arrays," 2014 IEEE Wireless Communications and Networking Conference (WCNC), 2014, 3 pages.

* cited by examiner

METHODS AND SYSTEMS FOR LINE-OF-SIGHT (LOS) MULTIPLE-INPUT AND MULTIPLE-OUTPUT (MIMO) COMMUNICATIONS WITH ANTENNA MISALIGNMENTS

CROSS-REFERENCE TO RELATED APPLICATION

This application claims the priority benefit under 35 U.S.C. § 119(e) of U.S. Provisional Application No. 63/087,170, filed on Oct. 2, 2020, the disclosure of which is incorporated herein by reference in its entirety.

TECHNICAL FIELD

The subject matter disclosed herein relates to wireless communications. More particularly, the subject matter disclosed here relates to a system and a method for efficiently handling rotational and translational errors for line-of-sight (LOS) communications by estimating antenna misalignments and using the estimated antenna misalignments to form an optimal beam that may provide the best performance based on the channel conditions.

BACKGROUND

Antenna-array structures used for wireless communications are usually pre-designed based on certain objectives. Once deployed, a pre-designed antenna-array structure is then physically fixed and cannot be easily changed in practical situations. Consequently, communication performance may vary depending on channel conditions for such pre-designed antenna structures. The same drawback may also apply to LOS wireless communications.

LOS communication may be a useful scenario in the upcoming Sixth Generation (6G) standard for wireless communications. For LOS communications, estimation of antenna misalignment, e.g., rotational or translational errors, may become important because such errors may severely affect overall performance if not properly handled. Rotational and translational misalignments will naturally occur especially when multiple receivers that are located at random locations in a three-dimensional (3D) space simultaneously communicate with a transmitter.

SUMMARY

An example embodiment provides a receiving device in a LOS wireless communication system that may include a processor and a transmitter. The processor may determine a rotational estimate and a translational estimate of the receiving device with respect to a sending device that is external to the receiving device. The transmitter may be internal to the receiving device and sends feedback information to the sending device. The feedback information may be used by the sending device to determine an optimal beamforming matrix for LOS communications between the receiving device and the sending device in which the feedback information may include estimated rotational angles between the receiving device and the sending device and an estimated translational distance between the receiving device and the sending device, or may include an offset angle between a first plane of antennas of the receiving device and a second plane of antennas of the sending device, a normal vector of the first plane of antennas and the estimated translational distance. In one embodiment, the estimated rotational angles may include an estimated bearing angle, an estimated downtilt angle, and an estimated slant angle, and the normal vector may include a vector that is perpendicular to a plane that is a best match to a plane of subarrays of the sending device. In another embodiment, the receiving device may further include at least one single-element antenna coupled to the transmitter. In still another embodiment, the receiving device may further include at least one subarray of antenna elements coupled to the transmitter, in which case the processor may further determine the estimated rotational angles between the receiving device and the sending device based on multiple angle-of-arrival directions determined for each subarray of the receiving device with respect to the sending device. In one embodiment, the processor may further determine an estimated center of each subarray to determine the estimated rotational angles between the receiving device and the sending device based on the multiple angle-of-arrival directions determined for each subarray of the receiving device with respect to the sending device. In one embodiment, the sending device may receive the feedback information sent from the receiving device and may determine the optimal beamforming matrix for LOS communications between the receiving device and the sending device based on the feedback information.

An example embodiment provides a sending device in a LOS wireless communication system in which the sending device may include a receiver and a processor. The receiver may receive feedback information from a receiving device that is external to the sending device. The feedback information may include estimated rotational angles between the receiving device and the sending device and an estimated translational distance between the receiving device and the sending device, or may include an offset angle between a first plane of antennas of the receiving device and a second plane of antennas of the sending device, a normal vector of the first plane of antennas and the estimated translational distance. The processor may determine an optimal beamforming matrix for LOS communications between the sending device and the receiving device using the feedback information. In one embodiment, the estimated rotational angles include an estimated bearing angle, an estimated downtilt angle, and an estimated slant angle, and the normal vector may include a vector that is perpendicular to a plane that is a best match to a plane of subarrays of the sending device. In one embodiment, the sending device may include the receiving device. In another embodiment, the receiving device may include at least one single-element antenna coupled to the sending device. In still another embodiment, the receiving device may further include at least one subarray of antenna elements coupled to the sending device. The estimated rotational angles between the receiving device and the sending device may be determined based on multiple angle-of-arrival directions determined for each subarray of the receiving device with respect to the sending device. In one embodiment, the processor may further determine an estimated center of each subarray to determine the estimated rotational angles between the receiving device and the sending device.

An example embodiment provides a method to determine an optimal beamforming matrix for LOS communications between a receiving device and a sending device in an LOS wireless communication system, the method comprising: determining at the receiving device a rotational estimate and a translational estimate of the receiving device with respect to the sending device; and sending feedback information from the receiving device to the sending device in which the feedback information may include estimated rotational angles between the receiving device and the sending device and an estimated translational distance between the receiving device and the sending device, or may include an offset angle between a first plane of antennas of the receiving device and a second plane of antennas of the sending device, a normal vector of the first plane of antennas and the estimated translational distance; and determining, at the sending device, the optimal beamforming matrix for LOS communications between the receiving device and the sending device. In one embodiment, the estimated rotational angles may include an estimated bearing angle, an estimated downtilt angle, and an estimated slant angle, and the normal vector may include a vector that is perpendicular to a plane that is a best match to a plane of subarrays of the sending device. In one embodiment, the receiving device may include at least one single-element antenna. In another embodiment, the receiving device may include at least one subarray of antenna elements, in which case the method may further include determining at the receiving device the estimated rotational angles between the receiving device and the sending device based on multiple angle-of-arrival directions determined for each subarray of the receiving device with respect to the sending device. In one embodiment, the method may further include determining at the receiving device an estimated center of each subarray to determine the estimated rotational angles between the receiving device and the sending device based on the multiple angle-of-arrival directions determined for each subarray of the receiving device with respect to the sending device.

BRIEF DESCRIPTION OF THE DRAWING

In the following section, the aspects of the subject matter disclosed herein will be described with reference to exemplary embodiments illustrated in the figure, in which.

DETAILED DESCRIPTION

Figure 1A:
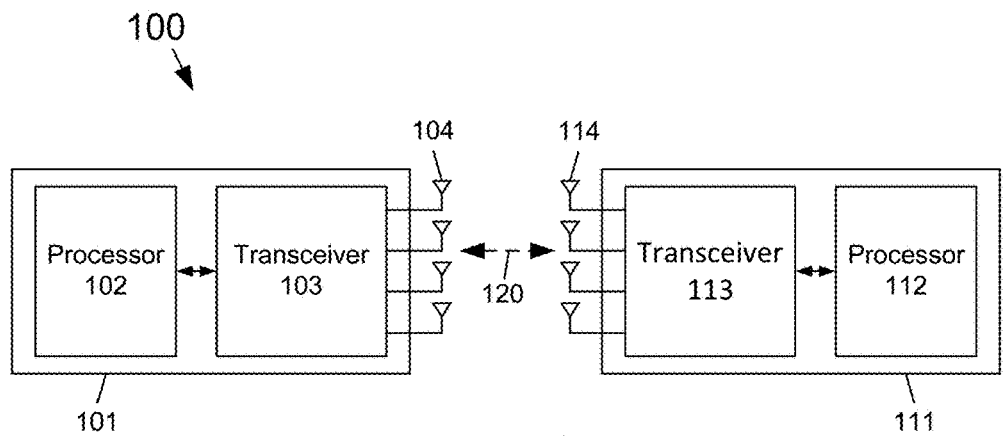
FIG. 1A depicts an example embodiment of a LOS communication system that may use the techniques disclosed herein to compensate for rotational or translational misalignments of antennas and to provide the best performance for LOS communications based on the channel conditions.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC), an assembly, and so forth.

LOS communications may likely be an increasingly common type of wireless communications in the near future based on very high carrier frequencies associated with 6G-based communications. The subject matter disclosed herein provides a technique to compensate for rotational or translational misalignments of antennas to provide the best performance for LOS communications based on the channel conditions.

In one embodiment, the subject matter disclosed herein provides an efficient way of handling rotational and translational errors for 6G LOS communications by estimating antenna misalignments and reporting misalignment information to the transmitter as feedback. The transmitter may then determine an optimal beamforming matrix based on the misalignment feedback information.

In another embodiment, the subject matter disclosed herein provides a system and a method for providing optimal LOS channel performance by estimating multiple parameters related to rotational and translational misalignments between transmit (Tx) and receive (Rx) antennas. Misalignment may be estimated and reported as feedback to the transmitter. The transmitter may use the estimated misalignment information to form an optimal beam that may provide the best performance based on the channel conditions.

The subject matter disclosed herein provides a series of techniques that enable systematic estimations of multiple crucial parameters in a LOS communication system. The techniques may be implemented with currently popular antenna structures that use antenna subarrays. It is likely that the currently popular antenna structures may be even more popular for 6G communications based on the very high carrier frequency and smaller form factors associated with 6G communications. The techniques disclosed herein may also be implemented without using an antenna array. Thus, the subject matter disclosed herein may provide a solid solution for both traditional and newly emerging hardware structures.

The subject matter disclosed herein may be used with any shape of Tx antenna arrays based on the shape being known to the receiver. The subject matter disclosed herein may be implemented either using or without using the commonly used Rx antenna subarrays, and the subject matter disclosed herein may be used to avoid using large codebooks and may report only a relatively small amount of information as feedback.

Without using the subject matter disclosed herein, the transmitter and receiver would have to agree to use some predefined precoding (beamforming) codebook. For good performance, the size of such a codebook would likely be large, similar to in 5G New Radio (NR) standards. The subject matter disclosed herein may, however, completely avoid using a conventional type of beamforming codebook, by instead using feedback information of a couple of key parameters to the transmitter. The techniques disclosed herein may also exhibit better performance because there is no quantization of beamforming direction that exists in any practically-designed precoding codebooks.

As used herein, a boldface symbol, such as x, indicates a 3D location in a global coordinate system, and a boldface symbol with an overbar, such as $\bar{x}$, indicates a location in a local coordinate system. A vector representing 3D location of a point may include x,y and z coordinates as elements of the vector. In that regard, the first, second and third elements of a vector representing a 3D location of a point respectively indicate the x, y and z components of the location in the corresponding coordinate system. Symbols that include a hat, such as $\hat{x}$, indicate an estimate of a location of a point x, and $\hat{X}$, indicate an estimate of a location of a matrix (or an array) X of points. A symbol that includes a *, like x* indicates a complex conjugate of a complex number x, and a symbol like $X^T$ indicates the transpose of a matrix X.

FIG. 1A depicts an example embodiment of a LOS communication system 100. The LOS communication system 100 may include a first wireless communication device 101 and a second wireless communication device 111. The communication device 101 may include a processor 102, a transceiver 103, and one or more antennas 104. The communication device 111 may include a processor 112, a transceiver 113, and one or more antennas 114. The communication devices 101 and 111 may wirelessly communicate over a LOS communication link 120. At times, the communication device 101 may be considered to be a transmitter that wirelessly communicates to the communication device 111, which may be considered to be a receiver. At other times, the communication device 111 may be considered to be a transmitter that wirelessly communicates to the communication device 101, which may be considered to be a receiver. The communication devices 101 and 111 may be configured to estimate antenna misalignments and using the estimated antenna misalignments to form an optimal beam that may provide the best performance based on the channel conditions as described herein.

Figure 1B:
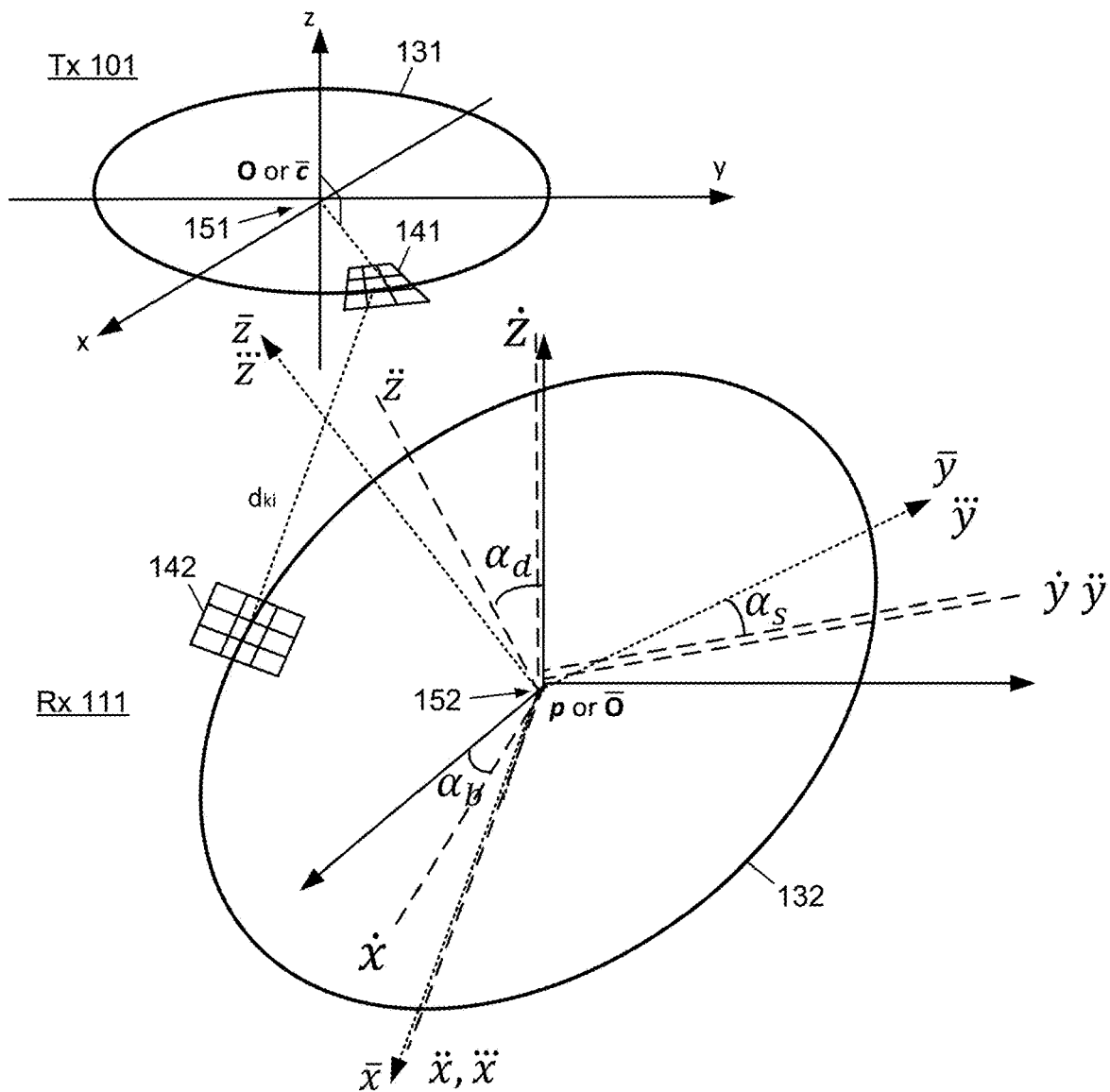
FIG. 1B depicts geometrical aspects of the LOS communication system in FIG. 1A that may be used to provide rotational and translational error estimation according to the subject matter disclosed herein.

FIG. 1B depicts geometrical aspects of the LOS communication system 100 in FIG. 1A that may be used to provide rotational and translational error estimation according to the subject matter disclosed herein. The transmitter Tx 101 may use antenna arrays of different shapes, e.g., circular, linear, or rectangular, etc. Similarly, the receiver Rx 111 may also use antenna arrays of different shapes. For illustration purposes, both the transmitter Tx 101 and receiver Rx 111 are respectively depicted in FIG. 1B as having circularly shaped arrays by circular shapes 131 and 132. An i-th Tx subarray 141 and a k-th Rx subarray 142 are respectively depicted as part of arrays 131 and 132. It should be noted that although only one subarray 141 is depicted for the Tx antenna array for clarity, there may be other subarrays that are not shown in FIG. 1B. Similarly, only one subarray 142 is depicted for the Rx antenna array for clarity, there may be other subarrays that are not shown. In an alternative embodiment, the subarrays of the Tx 101 and/or the subarrays of the Rx 111 may be single-element antennas as the rotational and translational error estimation techniques disclosed herein may be used with and without subarrays.

The total number of Tx and Rx antenna elements may respectively be $N_t$ and $N_r$. The Tx antennas may be placed in a global coordinate system (GCS) 151, i.e., x, y, and z axes, and the Rx antennas may be placed in a local coordinate system (LCS) 152, i.e., $\bar{x}$, $\bar{y}$, and $\bar{z}$ axes, to model the arbitrary antenna rotation errors and translation. A point in the GCS 151 is indicated herein by t, and a point in the LCS 152 is indicated herein by $\bar{r}$.

The center of the Tx array 131 may be assumed to be located at the origin of the GCS 151. The receiver Rx 111 may be located at arbitrary point in space, and the center of the Rx array 132 may be assumed to be the origin of the LCS 152. The center location of the Rx circle has an offset of $\bar{c}$ (i.e., value in LCS) from the origin of the GCS 151. The distance between the Tx and Rx center may be determined by a translation parameter (or offset) $\bar{c}$, and may be referred to herein as D (the distance between Tx and Rx center, and not indicated in FIG. 1B). The parameter $\bar{c}$ may also be considered as the location of the transmitter Tx 101 from the point of view of the receiver Rx 111 (i.e., LCS). Similarly, p may be defined to be the location of the center of the Rx array in the GCS 151. The symbols 0 and $\bar{0}$ respectively represent the origin, or center, of the transmitter Tx in the GCS and the LCS. Based on these relationships, $p=-B^T\bar{c}$ and $\bar{c}=-Bp$, in which B is a traditional rotation matrix that can be found in many textbooks or web materials including 3GPP specifications.

Three-dimensional rotation angles of the LCS 152 compared to the GCS 151 may be represented by $\alpha_b$, $\alpha_d$ and $\alpha_s$, which may be referred to as Euler angles, and may sometimes be separately called respectively bearing, downtilt and slant angles. The Euler angles may have multiple different rotation orders and rotation axes, and the order and axis of order used herein may be one possible way to represent the overall 3D rotation. As used herein, only the term "rotation angle" is used in place of Euler angle. The rotation matrix B may be defined from the three angle parameters $\alpha_b$, $\alpha_d$ and $\alpha_s$.

Any arbitrary 3D rotation may be specified by three ordered rotations about the z, $\dot{y}$ and $\ddot{x}$ axes. The single-dotted and double-dotted nomenclature indicate that these axes may be the results of one (˙) or two (¨) intermediate rotations. In other words, $\dot{y}$ is the y-axis after the first rotation about z. Similarly, $\ddot{x}$ is the x-axis after two rotations, i.e., the first rotation about z and the second rotation about $\dot{y}$. A first rotation of $\alpha_b$ about z sets the antenna bearing angle. A second rotation of $\alpha_d$ about $\dot{y}$ sets the downtilt angle, and a third rotation of $\alpha_s$ about $\ddot{x}$ sets the slant angle. The orientation of the x, y and z axes after all three rotations may be denoted as $\dddot{x}$, $\dddot{y}$, and $\dddot{z}$. The triple-dotted axes represent the final orientations of the LCS 152, and for notational purposes denoted herein as x, y, and z axis. The conversion between LCS and GCS may be provided by $$t=B^T(\bar{t}-\bar{c}), \bar{t}=Bt+\bar{c}, \quad (1)$$

in which t is a location in the GCS and $\bar{t}$ is the location in the LCS. The parameter B is a 3×3 rotation matrix.

The LOS channel may be modeled as a free space channel without multipath. The transmitter 101 may transmit training signals to the receiver 111 so that the receiver 111 may estimate the channel. The channel $h_{ij}$ coefficient between i-th transmit antenna (at 141) and j-th receive antenna (at 142) in a channel matrix H may be written as $$h_{i,j} = \frac{\lambda}{4\pi d_{ij}} \exp\left(-j\frac{2\pi d_{ij}}{\lambda}\right), \quad (2)$$

in which $d_{ij}$ is the corresponding distance between the antenna pair i,j.

Depending on the translational and rotational errors, the channel conditions may vary causing performance variations. To optimize performance, such as minimizing decoding error rate or maximizing channel capacity, it is important to know the current channel conditions. With knowledge of the current channel conditions, it may be possible for the transmitter Tx 101 and the receiver Rx 111 to find the best counteraction to maximize performance given the current channel conditions. One possible action may be to use the best beamforming matrix at the transmitter Tx 101. The best beamforming matrix may be obtained using a singular value decomposition (SVD) of the channel matrix. Obtaining the best beamforming matrix, may, however, only be possible when the transmitter Tx 101 has full knowledge of the channel, which may be difficult and tricky in practice. For the transmitter Tx 101 to have full knowledge of the channel (which includes rotational and translational error estimations), the following approach may be used.

Figure 4A:
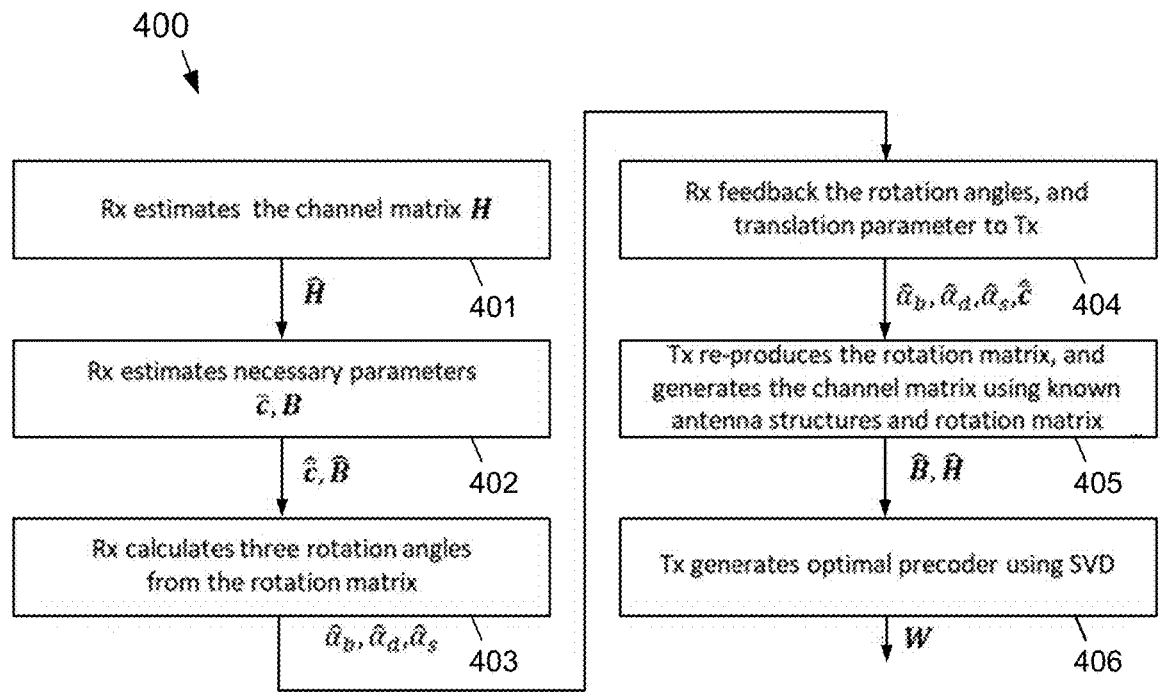
FIG. 4A is a flow diagram of a first example embodiment of a method for providing optimal LOS channel performance by estimating multiple parameters related to rotational and translational misalignments between transmit and receive antennas according to the subject matter disclosed herein.

It may be seen that the channel is a direct function of Tx-Rx distance, which is in turn a direct function of the rotation matrix B and the translation parameter c because it will change with each distance pair between Tx and Rx antenna. Put differently, if the transmitter Tx knows B and c, the transmitter may fully re-generate the channel matrix H, and is, therefore, able to derive the theoretically optimal precoder from SVD of H. This approach may be broken down into multiple steps, and the overall high-level descriptions for the steps are shown in FIG. 4A.

In a system configuration in which no subarrays are used, the k-th receiver Rx and i-th transmitter Tx subarrays depicted in FIG. 1A each are modeled as single-element antennas. Based on the GCS location of the Rx antenna, $r=B^T \bar{r}+p$, the squared distance between k-th Rx antenna and i-th Tx antenna may be written as $$(t_i-p-B^T\bar{r}_k)^T(t_i-p-B^T\bar{r}_k)=d_{ki}^2. \quad (3)$$

So, $$(t_i-p)^T(t_i-p)+\bar{r}_k^T\bar{r}_k-2(t_i-p)^T B^T \bar{r}_k=d_{ki}^2. \quad (4)$$

Using Eq. (Error! Reference source not found.) and taking a summation over k yields:

$$\sum_{i=0}^{N_r-1}(t_i-p)^T(t_i-p)+\sum_{k=0}^{N_r-1}\bar{r}_k^T\bar{r}_k-2(t_i-p)^T B^T \sum_{k=0}^{N_r-1}\bar{r}_k= \quad (5a)$$
$$\sum_{k=0}^{N_r-1} d_{ki}^2$$

$$(t_i-p)^T(t_i-p)=\frac{1}{N_r}\left(\sum_{k=0}^{N_r-1}d_{ki}^2-\sum_{k=0}^{N_r-1}\bar{r}_k^T\bar{r}_k\right) \triangleq \Omega_i \quad (5b)$$

Using Eq. (Error! Reference source not found.) and taking a summation over i yields:

$$\sum_{i=0}^{N_t-1}(t_i-p)^T(t_i-p)+\sum_{i=0}^{N_t-1}\bar{r}_k^T\bar{r}_k-2\sum_{i=0}^{N_t-1}(t_i-p)^T B^T \bar{r}_k= \quad (6a)$$
$$\sum_{i=0}^{N_t-1} d_{ki}^2$$

$$\sum_{i=0}^{N_t-1}(t_i-p)^T(t_i-p)+N_t\bar{r}_k^T\bar{r}_k+2N_t p^T B^T \bar{r}_k=\sum_{i=0}^{N_t-1}d_{ki}^2 \quad (6b)$$

$$\sum_{i=0}^{N_t-1}\Omega_i+N_t\bar{r}_k^T\bar{r}_k+2N_t p^T B^T \bar{r}_k=\sum_{i=0}^{N_t-1}d_{ki}^2 \quad (6c)$$

$$\hat{\bar{c}}=\frac{1}{2N_t}\bar{r}_k^{T-1}\left(\sum_{i=0}^{N_t-1}\Omega_i+N_t\bar{r}_k^T\bar{r}_k-\sum_{i=0}^{N_t-1}d_{ki}^2\right) \quad (6d)$$

in which the relationship $p^T B^T=-\bar{c}^T$ is used. The estimate of $\bar{c}$ in Eq. (6d) is performed for every k, and then averaged to provide a final estimate. The estimate $\hat{\bar{c}}$ is the estimated location of the Tx origin from the perspective of the Rx.

Equation (4) may be expanded using $p=-B^T\bar{c}$, to obtain $$t_i^T B^T(\bar{r}_k-\bar{c})=1/2(t_i^T t_i+\bar{r}_k^T\bar{r}_k-2\bar{r}_k^T\bar{c}+\bar{c}^T\bar{c}-d_{ki}^2). \quad (7)$$

By defining three matrices, P (size $N_t \times N_r$) with an (i,k)-th element being $\frac{1}{2}(t_i^T t_i+\bar{r}_k^T\bar{r}_k-2\bar{r}_k^T\bar{c}+\bar{c}^T\bar{c}-d_{ki}^2)$ T (size $3\times N_t$) with an i-th column being $t_i$; and R (size $3\times N_r$) with a k-th column being $\bar{r}_k-\bar{c}$, Eq. (7) may be rewritten as $$T^T B^T R=P. \quad (8)$$

Thus, an estimate of the rotation matrix B may be obtained as $$\hat{B}=(R^T)^{-1}P^T T^{-1}. \quad (9)$$

Estimates of the three angles may then be calculated from $\hat{B}$ as $$\hat{\alpha}_d=\sin^{-1}(-\hat{B}_{20}), \quad (10a)$$

$$\hat{\alpha}_b=\sin^{-1}\left(\frac{\hat{B}_{10}}{\cos\hat{\alpha}_d}\right), \text{ and} \quad (10b)$$

$$\hat{\alpha}_s=\sin^{-1}(\hat{B}_{21}/\cos\hat{\alpha}_d). \quad (10c)$$

Figure 2:
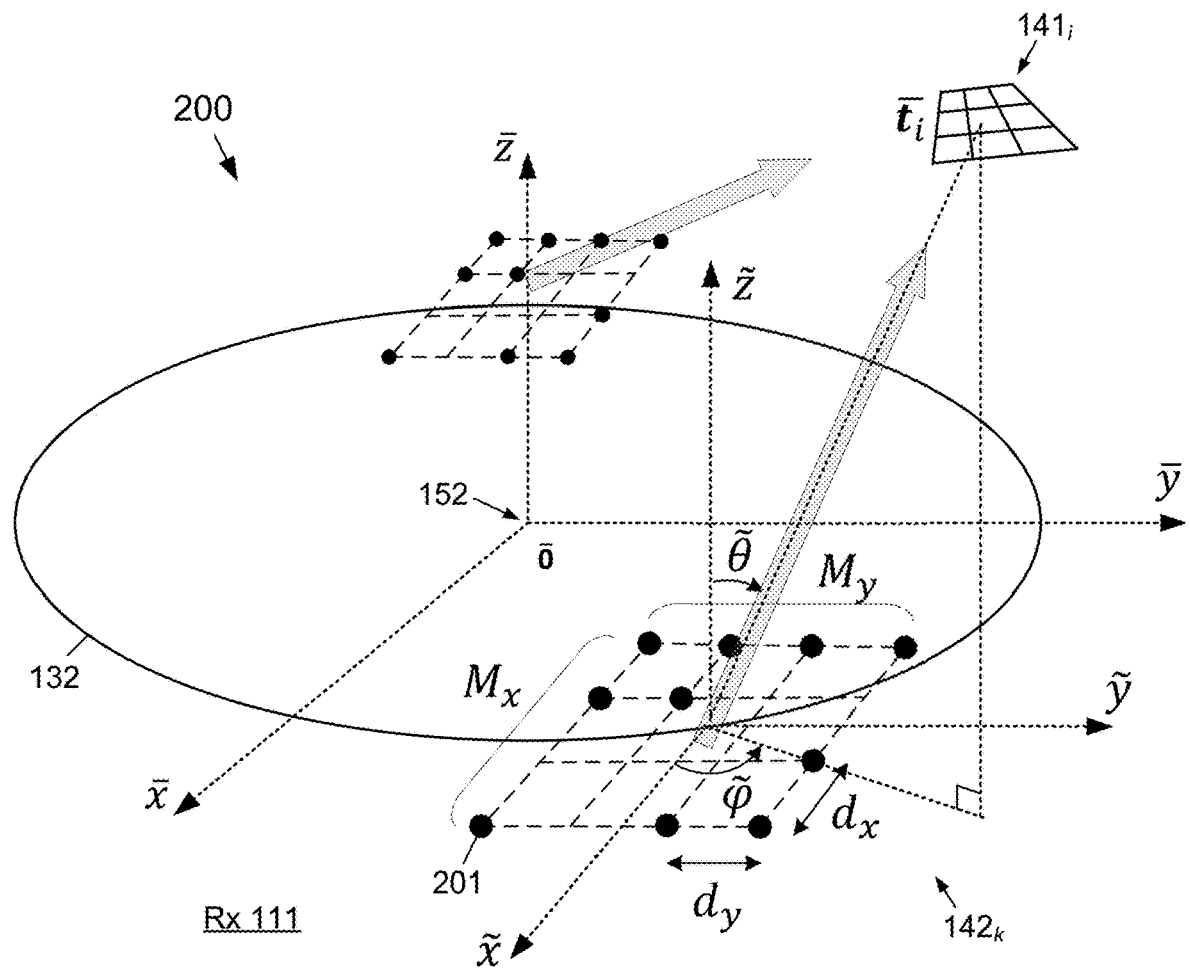
FIG. 2 conceptually depicts an estimation of an angle of arrival for an i-th Tx subarray from a Rx subarray according to the subject matter disclosed herein.

In a system configuration subarrays in which are used, an estimation of an angle-or-arrival (AOA) is generated for each Rx array for every Tx array. FIG. 2 conceptually depicts an estimation of AOA for an i-th Tx subarray from a Rx subarray according to the subject matter disclosed herein. As depicted in FIG. 2, an example Rx subarray $142_k$ includes multiple antenna elements 201 in an $M_x \times M_y$ array. The distance between elements 201 in an x direction is dx, and the distance between elements in a y direction is dy.

Each antenna element 201 in a Rx subarray 142 experiences different phase of the same signal. The phase difference may be a function of two angles $\tilde{\theta}$ and $\tilde{\varphi}$ in FIG. 2. The arriving signal at a Rx panel may be approximated to be a planar wave due to a high density of antenna elements 201 within a subarray $142_k$. It may also be assumed that the signal arriving at different Rx subarrays from $142_k$ exhibit different arriving angles due to larger spacing between subarrays, as depicted in FIG. 2. Based on this assumption of a planar wave arriving at a Rx subarray $142_k$, the antenna element 201 at the m-th row and the n-th column of a subarray will experience the phase shift by $$\frac{m 2\pi d_x \cos\tilde{\varphi}\sin\tilde{\theta}}{\lambda}+\frac{n 2\pi d_y \sin\tilde{\varphi}\sin\tilde{\theta}}{\lambda}. \quad (11)$$

This is due to the distance variation in the channel model of Eq. (2). Thus, by estimating these angles, the AOA may be estimated.

An estimation of AOA of the signals arriving from each Tx subarray $141_i$ at a Rx subarray $142_k$ may be performed using an AOA estimation algorithm, such as the multiple signal classification (MUSIC) algorithm, for each Rx subarray $142_k$ for each Tx subarray $141_i$ to generate $\tilde{\theta}$ and $\tilde{\varphi}$.

Figure 3:
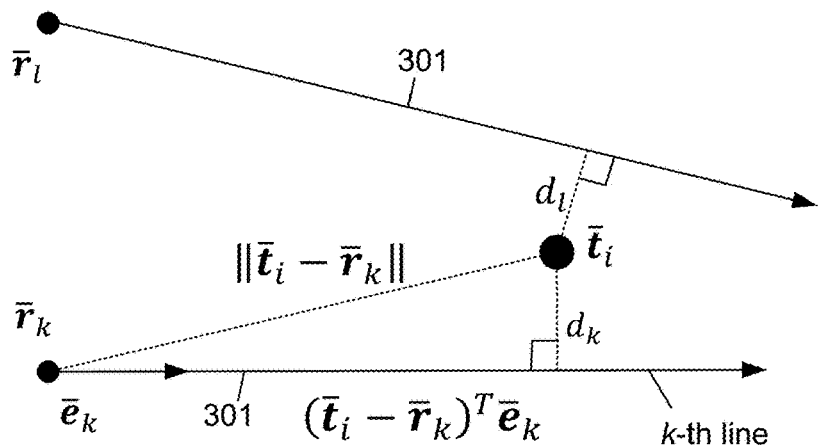
FIG. 3 depicts an example least-square algorithm that may be used to determine a best point $\bar{t}_i$ for an i-th transmitter subarray from the estimates of the angle-of-arrival at multiple receiver subarrays according to the subject matter disclosed herein.

As a first step, multiple directions may be obtained (one from each subarray $142_k$) that point to the same Tx subarray $141_i$. Due to noise and the resolution of detected angles, the multiple directions that are obtained may not cross each other, especially in 3D space. Consequently, a least-square algorithm may be used to determine the best point $\bar{t}_i$ for an i-th Tx subarray that is used for estimating AOA for a Rx subarray $141k$. The least-square algorithm may minimize a summation of distances, e.g., $d_k$ and $d_l$, as depicted in FIG. 3, between a candidate point $\bar{t}_i$ for i-th Tx subarray and the lines 301 that are defined by the AOA and each Rx panel location. It should be noted that FIG. 3 only depicts a two-dimensional space whereas the AOA determination disclosed herein is performed in 3D space.

Using the estimated Tx locations $\bar{t}_i$, the translation parameter may be estimated as $$\bar{c}=E(\hat{t}_i). \quad (12)$$

As a second step, the rotation matrix $\hat{B}$ is estimated. Using the relationship in Eq. (1), an optimization problem may be formulated as $$\hat{B} = \min_{B} \left\| B^T(\hat{\bar{T}} = -\hat{\bar{C}}) - T \right\|^2 \quad (13)$$

in which $\hat{\bar{T}}$ is the matrix of which the i-th column is the estimated location of i-th Tx subarray in LCS based on the estimated AOA and Eq. (12). The parameter T is the matrix of which the i-th column is the known location of the i-th Tx subarray in the GCS. The matrix $\bar{C}$ is the augmented matrix in which all columns are $\bar{c}$.

It may be possible to directly solve Eq. (13) using an iterative approach, such as a gradient descent approach. However, to avoid an iterative approach, a two-step approach may be used in which the matrix B may be divided into two matrices for the estimation process, as $$\hat{R}_\omega, \hat{R}_{rod} = \min_{R_\omega, R_{rod}} \left\| R_\omega R_{rod}(\hat{\bar{T}} = -\hat{\bar{C}}) - T \right\|^2 \quad (14)$$

in which $R_{rod}$ is a Rodrigues rotation, and $R_\omega$ is a 2D rotation by $\omega$.

$R_\omega$ may be written as $$R_\omega = \begin{bmatrix} \cos\omega & -\sin\omega & 0 \\ \sin\omega & \cos\omega & 0 \\ 0 & 0 & 1 \end{bmatrix}. \quad (15)$$

Then, with the estimates for $R_{rod}$ and $R_\omega$, an estimate of the rotation matrix may be calculated as $$\hat{B} = (\hat{R}_\omega \hat{R}_{rod})^T. \quad (16)$$

The estimation process may be further simplified so that $R_{rod}$ and $R_\omega$ are estimated one-by-one, which becomes an additional two-step approach. Overall, $\bar{c}$ is estimated first, and then $R_{rod}$ and $R_\omega$ are each estimated one-by-one for $\hat{B}$.

Note that after the second step in this two-step approach, multiple points are obtained for each Tx subarrays, i.e., $\bar{t}_i$. Due to noise, the locations may not be on the same plane in 3D space. Those points, however, are supposed to be on the same plane as in the system model 100 depicted in FIG. 1. Therefore, 3D fitting may be done to suppress the effects of noise. The points are fitted using a true shape of Tx array structure. Conceptually speaking, by considering all possible 3D rotation of the true shape, the best rotation of the true shape may be found.

The 3D circle fitting can be done in multiple steps by bringing all points to the origin by subtracting the average location of the detected Tx panel locations. The best plane is found that is close to all points, which may be done by finding the normal vector of the plane. The normal vector may be obtained using SVD of the location matrix in which each row represents the (x,y,z) value of each point. The singular vector corresponding to the smallest singular value is chosen to be the normal vector. The selected best plane may be rotated and so that all points now lie on the x-y plane (called Rodrigues rotation, and from which the corresponding $R_{rod}$ may be found. The true Tx array shape (which is known to the receiver) is compared with the points on the x-y plane, and the best phase rotation of the true shapes is found that matches the current points. The 2D rotation matrix $R_\omega$ may now be found, which provides the best-fitted locations in the 2D x-y plane. Now, with $R_{rod}$ and $R_\omega$, the matrix B can be found using Eq. (16).

From the estimates of $\hat{B}$, the rotation angles may be calculated as in Eq. (10), the estimate of $\bar{c}$ and estimates of $\hat{\alpha}_b$, $\hat{\alpha}_d$ and $\hat{\alpha}_s$ may be sent to the transmitter as feedback. Then, the transmitter may fully reproduce the channel matrix, and calculate the best precoding matrix using SVD. This may be possible because the LOS channels are completely defined using the distance between Tx and Rx antenna pair.

FIG. 4A is a flow diagram of a first example embodiment of a method 400 for provide optimal LOS channel performance by estimating multiple parameters related to rotational and translational misalignments between Tx and Rx antennas according to the subject matter disclosed herein. At 401, the receiver estimates the channel matrix H. This estimation is an important aspect that may involve sophisticated techniques. It may be made harder when using antenna subarrays as in mmWave that involve sophisticated processing, such as, but not limited to a compressed sensing technique. Details of estimating the channel matrix Ĥ are not disclosed herein, and it is assumed that noisy receive-channel values may be available to a receiver Rx for all Tx-Rx pairs. At 402, estimation of parameters for generating c and B is performed at the receiver Rx. At 403, estimation of the three rotation angles $\hat{\alpha}_b$, $\hat{\alpha}_d$ and $\hat{\alpha}_s$ are performed. At 404, the receiver Rx sends the translation estimate $\bar{c}$ and estimates of the three rotation angles $\hat{\alpha}_b$, $\hat{\alpha}_d$ and $\hat{\alpha}_s$ to the transmitter Tx as feedback information. At 405, the transmitter Tx reproduces the rotation matrix B and generates the channel matrix using known antenna structure information and the reproduced rotation matrix B. At 406, the transmitter Tx generates an optimal precoder W using an SVD technique.

Figure 4B:
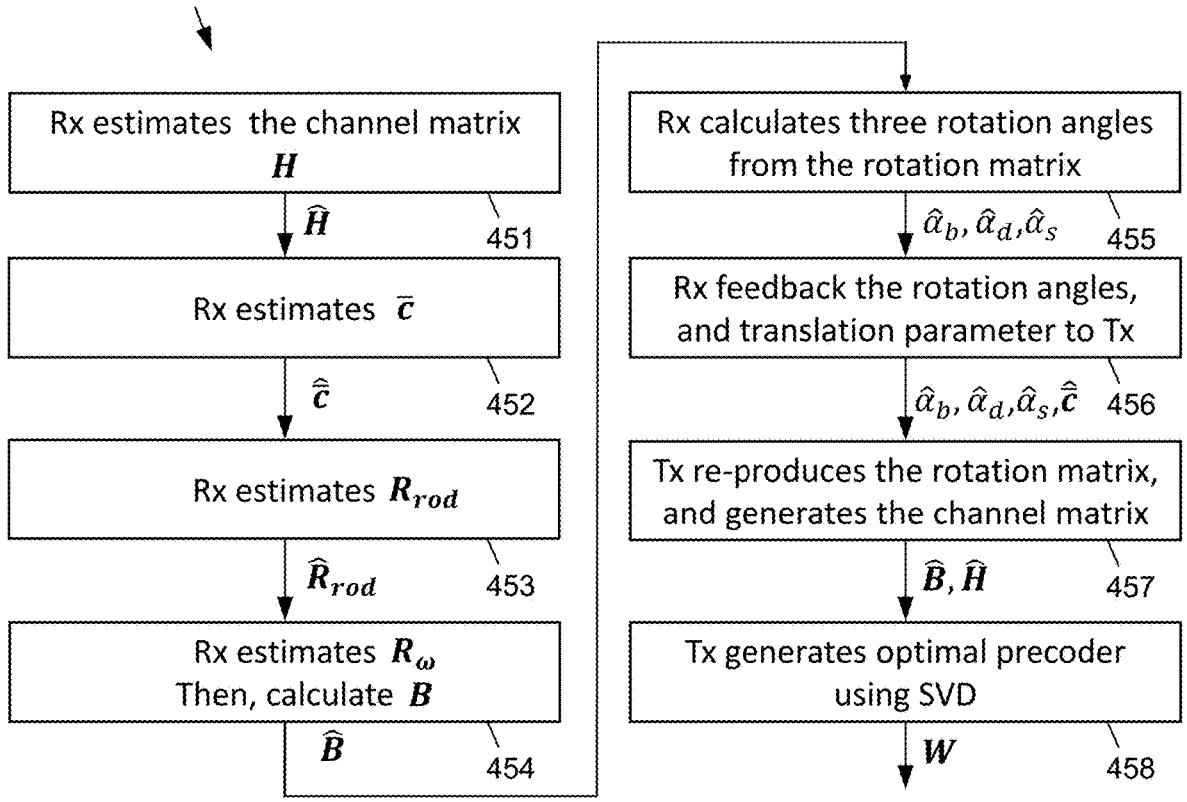
FIG. 4B is a flow diagram of a second example embodiment of a method for providing optimal LOS channel performance by estimating multiple parameters related to rotational and translational misalignments between transmit and receive antennas according to the subject matter disclosed herein.

FIG. 4B is a flow diagram of a second example embodiment of a method 450 for provide optimal LOS channel performance by estimating multiple parameters related to rotational and translational misalignments between Tx and Rx antennas according to the subject matter disclosed herein. At 451, the receiver estimates the channel matrix H. At 452, the receiver estimates $\bar{c}$. At 453, the receivers estimates $R_{rod}$. At 454, the receiver estimates $R_\omega$ and then calculates B. At 455, the receiver calculates the three rotation angles $\hat{\alpha}_b$, $\hat{\alpha}_d$ and $\hat{\alpha}_s$. At 456, the receiver Rx sends the translation estimate $\bar{c}$ and estimates of the three rotation angles $\hat{\alpha}_b$, $\hat{\alpha}_d$ and $\hat{\alpha}_s$ to the transmitter Tx as feedback information. At 457, the transmitter Tx reproduces the rotation matrix B and generates the channel matrix using known antenna structure information and the reproduced rotation matrix B. At 458, the transmitter Tx generates an optimal precoder W using an SVD technique.

The subject matter disclosed herein also provides alternative feedback information that may be sent to the transmitter to provide optimal LOS channel performance Tx and Rx antennas according to the subject matter disclosed herein. The rotational offset of the points on the x-y plane may be compared to a zero angle, and this offset may be defined as $\omega$. The offset $\omega$ may be found by considering a phase difference between the fitted data points and reference points (i.e., the known subarray locations of the true Tx array shape). Only three parameters, i.e., the translation, normal vector, and $\omega$, are used to calculate $\hat{\bar{T}}$ using $R_\omega$ and $R_{rod}$. Then, the $\hat{B}$ matrix may be directly calculated at the transmitter Tx using Eq. (16). Then, the channel matrix may be directly calculated at the transmitter Tx and used for the optimal SVD-precoder calculation.

Table 1 shows the contents of the two different sets of feedback information that may be used to compensate for rotational or translational misalignments of antennas to provide the best performance for LOS communications based on the channel conditions, as disclosed herein. The difference is that in the first set of feedback information generated by the receiver Rx, the estimated rotation matrix $\hat{B}$ may be calculated, and then the estimated rotation angles $\hat{\alpha}_b$, $\hat{\alpha}_d$ and $\hat{\alpha}_s$ may be calculated. The estimated angles may be fed back to the transmitter Tx along with the translation error parameter $\tilde{c}$. At the transmitter Tx, the rotation matrix and the channel matrix H may be reconstructed. In the second set of feedback information, the translation $\tilde{c}$, the normal vector, and ω may be fed back to the transmitter Tx. At the transmitter Tx, points on the 2D x-y plane may be reconstructed to obtain $\hat{T}$. Using the translation $\tilde{c}$, the normal vector, and ω, the rotation matrix $\hat{B}$ and the channel matrix $\hat{H}$ may be reconstructed. Either set of feedback information may be used to generate $\hat{B}$, which in turn may be used for $\hat{H}$.

TABLE 1

Feedback Information Contents

| | Feedback Information Contents |
|---|---|
| Set 1 | $\tilde{c}$ and $\hat{\alpha}_b$, $\hat{\alpha}_d$ and $\hat{\alpha}_s$ |
| Set 2 | $\tilde{c}$, the normal vector, and ω |

Figure 5:
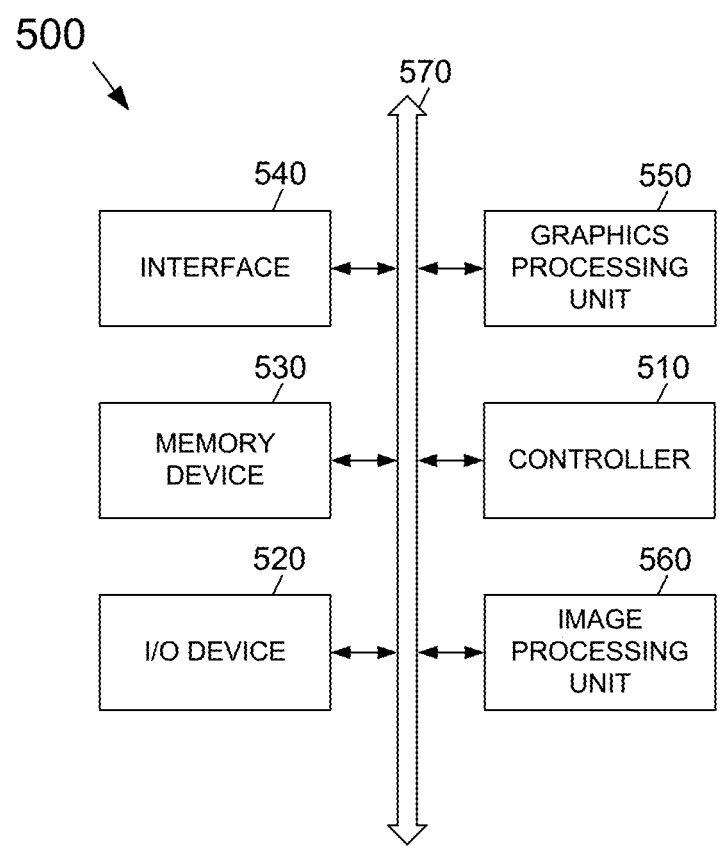
FIG. 5 depicts an electronic device that may be configured to provide optimal LOS channel performance using multiple estimated parameters related to rotational and translational misalignments between transmitter and receiver antennas according to the subject matter disclosed herein

FIG. 5 depicts an electronic device 500 that may be configured to provide optimal LOS channel performance by estimating multiple parameters related to rotational and translational misalignments between transmitter and receiver antennas according to the subject matter disclosed herein. In one embodiment, the electronic device 500 may be considered to be a transmitter that wirelessly communicates with a receiver device (not shown). In another embodiment, the electronic device 500 may be considered to be a receiver that wirelessly communicates with a transmitter device (not shown).

The electronic device 500 may include a controller 510, an input/output device 520 such as, but not limited to, a keypad, a keyboard, a display, a touch-screen display, a camera, and/or an image sensor, a memory 530, an interface 540, a GPU 550, and an imaging-processing unit 560 that are coupled to each other through a bus 570. The controller 510 may include, for example, at least one microprocessor, at least one digital signal processor, at least one microcontroller, or the like. The memory 530 may be configured to store a command code to be used by the controller 510 or a user data. In one embodiment, the controller 510 may be configured to generated estimates of rotational and translational antenna misalignments as disclosed herein. In another embodiment the controller may be configured to generate an optimal precoder using estimates of rotational and translational misalignments generated as disclosed herein. The various components of the electronic device 500 configured as a receiver or as a transmitter may include modules that may include any combination of software, firmware and/or hardware configured to provide the functionality disclosed herein.

Electronic device 500 and the various system components of electronic device 500 may include the image processing unit 560. The interface 540 may be configured to include a wireless interface that is configured to transmit data to or receive data from a wireless communication network using a RF signal. The wireless interface 540 may include, for example, an antenna. The electronic system 500 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service—Time Division Duplex (UMTS-TDD), High Speed Packet Access (HSPA), Evolution Data Optimized (EVDO), Long Term Evolution—Advanced (LTE-Advanced), Multichannel Multipoint Distribution Service (MMDS), Fifth-Generation Wireless (5G), Sixth-Generation Wireless (6G), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A receiving device in a line-of-sight (LOS) wireless communication system, the receiving device comprising:
   a processor that is configured to determine a rotational estimate and a translational estimate of the receiving device with respect to a sending device that is external to the receiving device; and
   a transmitter that is internal to the receiving device, configured to send feedback information to the sending device,
   wherein the feedback information is used by the sending device to determine an optimal beamforming matrix for LOS communications between the receiving device and the sending device, the feedback information comprising:
      estimated rotational angles between the receiving device and the sending device and an estimated translational distance between the receiving device and the sending device, or
      an offset angle between a first plane of antennas of the receiving device and a second plane of antennas of the sending device, a normal vector of the second plane of antennas and the estimated translational distance, wherein the estimated rotational angles between the receiving device and the sending device are determined based on a determination of multiple angle-of-arrival directions, a decomposition of a rotation matrix, or a direct estimation of the rotation matrix.

2. The receiving device of claim 1, wherein the estimated rotational angles include an estimated bearing angle, an estimated downtilt angle, and an estimated slant angle, and wherein the normal vector comprises a vector that is perpendicular to a plane that is a best match to a plane of subarrays of the sending device.

3. The receiving device of claim 1, further comprising at least one single-element antenna coupled to the transmitter.

4. The receiving device of claim 1, further comprising at least one subarray of antenna elements coupled to the transmitter.

5. The receiving device of claim 4, wherein the processor further determines the estimated rotational angles between the receiving device and the sending device based on multiple angle-of-arrival directions determined for each subarray of the receiving device with respect to the sending device.

6. The receiving device of claim 5, wherein the processor further determines an estimated center of each subarray to determine the estimated rotational angles between the receiving device and the sending device based on the multiple angle-of-arrival directions determined for each subarray of the receiving device with respect to the sending device.

7. The receiving device of claim 1, wherein the sending device receiving the feedback information sent from the receiving device and determining the optimal beamforming matrix for LOS communications between the receiving device and the sending device based on the feedback information.

8. A sending device in a line-of-sight (LOS) wireless communication system, the sending device comprising:
   a receiver configured to receive feedback information from a receiving device that is external to the sending device, the feedback information comprising:
      estimated rotational angles between the receiving device and the sending device and an estimated translational distance between the receiving device and the sending device, or
      an offset angle between a first plane of antennas of the receiving device and a second plane of antennas of the sending device, a normal vector of the second plane of antennas and the estimated translational distance, wherein the estimated rotational angles between the receiving device and the sending device are determined based on a determination of multiple angle-of-arrival directions, a decomposition of a rotation matrix, or a direct estimation of the rotation matrix; and
   a processor configured to determine an optimal beamforming matrix for LOS communications between the sending device and the receiving device using the feedback information.

9. The sending device of claim 8, wherein the estimated rotational angles include an estimated bearing angle, an estimated downtilt angle, and an estimated slant angle, and wherein the normal vector comprises a vector that is perpendicular to a plane that is a best match to a plane of subarrays of the sending device.

10. The sending device of claim 8, further comprising the receiving device.

11. The sending device of claim 10, wherein the receiving device comprises at least one single-element antenna coupled to the sending device.

12. The sending device of claim 10, wherein the receiving device further comprises at least one subarray of antenna elements coupled to the sending device.

13. The sending device of claim 12, wherein the estimated rotational angles between the receiving device and the sending device are determined based on multiple angle-of-arrival directions determined for each subarray of the receiving device with respect to the sending device.

14. The sending device of claim 13, wherein the processor further determines an estimated center of each subarray to determine the estimated rotational angles between the receiving device and the sending device.

15. A method to determine an optimal beamforming matrix for line-of-sight (LOS) communications between a receiving device and a sending device in an LOS wireless communication system, the method comprising:
   determining at the receiving device a rotational estimate and a translational estimate of the receiving device with respect to the sending device;
   sending feedback information from the receiving device to the sending device, the feedback information comprising:
      estimated rotational angles between the receiving device and the sending device and an estimated translational distance between the receiving device and the sending device, or
      an offset angle between a first plane of antennas of the receiving device and a second plane of antennas of the sending device, a normal vector of the second plane of antennas and the estimated translational distance, wherein the estimated rotational angles between the receiving device and the sending device are determined based on a determination of multiple angle-of-arrival directions, a decomposition of a rotation matrix, or a direct estimation of the rotation matrix; and
   determining, at the sending device, the optimal beamforming matrix for LOS communications between the receiving device and the sending device.

16. The method of claim 15, wherein the estimated rotational angles include an estimated bearing angle, an estimated downtilt angle, and an estimated slant angle, and wherein the normal vector comprises a vector that is perpendicular to a plane that is a best match to a plane of subarrays of the sending device.

17. The method of claim 15, wherein the receiving device comprises at least one single-element antenna.

18. The method of claim 15, wherein the receiving device comprises at least one subarray of antenna elements.

19. The method of claim 18, further comprising determining at the receiving device the estimated rotational angles between the receiving device and the sending device based on multiple angle-of-arrival directions determined for each subarray of the receiving device with respect to the sending device.

20. The method of claim 19, further comprising determining at the receiving device an estimated center of each subarray to determine the estimated rotational angles between the receiving device and the sending device based on the multiple angle-of-arrival directions determined for each subarray of the receiving device with respect to the sending device.

* * * * *